United States Patent [19]
Martinez

[11] Patent Number: 5,924,494
[45] Date of Patent: Jul. 20, 1999

[54] ANGLED ARBOR FOR A VERTICAL DRIVE SHAFT LAWN EDGER

[75] Inventor: David M Martinez, Brunswick, Ohio

[73] Assignee: MTD Products Inc, Cleveland, Ohio

[21] Appl. No.: 09/002,558

[22] Filed: Dec. 31, 1997

[51] Int. Cl.$^6$ .................................................. A01D 34/47
[52] U.S. Cl. ........................... 172/13; 172/15; 30/DIG. 5
[58] Field of Search .................................. 172/13, 15, 16, 172/17; 123/195 A; 56/11.8; 180/11, 19.1; 30/DIG. 5

[56] References Cited

U.S. PATENT DOCUMENTS

| | | | |
|---|---|---|---|
| 2,930,176 | 3/1960 | Lindell | 172/15 X |
| 3,192,693 | 7/1965 | Bergeson | 172/13 X |
| 3,690,384 | 9/1972 | Patterson | 172/15 |
| 3,900,071 | 8/1975 | Crawford | 172/15 |
| 5,540,286 | 7/1996 | Helmig | 172/15 |

*Primary Examiner*—Thomas B. Will
*Assistant Examiner*—Robert Pezzuto
*Attorney, Agent, or Firm*—Emerson & Associates; Roger D. Emerson; John M. Skeriotis

[57] ABSTRACT

A vertical drive shaft lawn edger has an arbor which allows the cutting blade to extend outwardly from the lawn edger, yet still be rigid and stable. The arbor is located at an angle α with respect to a longitudinal axis running perpendicular to the rear axle and lying within the same plane. The angle α is preferably 5° or less. The arbor is mounted to a frame of the lawn edger by a bracket and screws. A pivoting assembly enables the arbor to pivot thereby increasing or decreasing the angle α.

9 Claims, 3 Drawing Sheets

ANGLED ARBOR FOR A VERTICAL DRIVE SHAFT LAWN EDGER

BACKGROUND OF THE INVENTION

I. Field of the Invention

This invention relates to a lawn edger and more specifically, to an arbor for a vertical drive shaft lawn edger.

II. Description of the Related Art

The present invention contemplates a new and improved vertical drive shaft lawn edger that is simple in design, effective in use, and overcomes the foregoing difficulties and others while providing better and more advantageous overall results.

Lawn edgers are widely used in maintaining the appearance of lawns. They are primarily used to trim grass along the edges of driveways and curbs.

The prior art edgers typically use a horizontal output shaft that rotates a vertical cutting blade. A vertical drive pulley rotates a vertical driven pulley through a V-belt. The driven pulley rotates a vertical edger blade, which has a horizontal rotational axis. A vertical drive shaft engine has a horizontal driven pulley with its rotational axis vertical. In this arrangement, the V-belt is twisted to translate the vertical rotation of the drive pulley to the horizontal rotation of the driven pulley. The horizontal drive shaft engine configuration is preferred since the pulleys and the blade are oriented uniformly. However, lawn edgers with a horizontal drive shaft engine are relatively expensive because they are not as common as engines with a vertical drive shaft. Lawn mower engines typically utilize vertical drive shafts because many more lawnmowers are sold than are lawn edgers, engines with vertical drive shafts are produced in greater numbers and are therefore less expensive. Therefore, lawn edgers utilizing vertical drive shaft engines are desirable.

Vertical drive shaft lawn edgers typically feature engines mounted at the center of the unit. The engine is the heaviest item of the lawn edger. As such, equal distribution of weight along the support means is desired.

It is also desired to have the edging means extend outwardly from the lawn edger yet still be rigid and stable. The horizontal drive shaft engines are able to have the drive shaft in line with the driven pulley. Therefore, the distance between the edging means and the drive pulley is at a minimum. However, with vertical drive shaft engines this distance is increased due to the vertical orientation of the drive shaft.

SUMMARY OF THE INVENTION

In accordance with the present invention, a new and improved vertical drive shaft lawn edger is provided which allows an edging means to extend outwardly from the lawn edger yet still be rigid and stable.

An improved lawn edger is disclosed having an engine with a vertical drive shaft. The lawn edger also has a rear axle, a frame with front, side and rear portions, a center hole, and front and rear downturned portions. The center hole of the frame receives the vertical drive shaft engine.

A bearing spindle housing is located on an arbor which is mounted to the frame. A spring is located along the arbor and between a washer and the bearing spindle housing. The washer is also located along the arbor. The spring deflects and allows the bearing spindle housing to move along the arbor.

The rear axle and the arbor each have aligned centerlines and lie in the same plane. The centerline of the arbor is located at an angle α. Angle α is less than or equal to 5° from a longitudinal axis of the edger, the longitudinal axis of the edger is defined as perpendicular to the centerline of the rear axle and lying in the same plane as the centerline of the arbor.

A pivoting assembly is mounted to the frame and is able to pivot the arbor, thereby changing the angle α. The angle α can also be expressed as an angle less than 5° from a line perpendicular to a rotational axis of the vertical drive shaft and perpendicular to the centerline of the rear axle.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein.

DESCRIPTION OF THE PREFERRED EMBODIMENT

Figure 1:
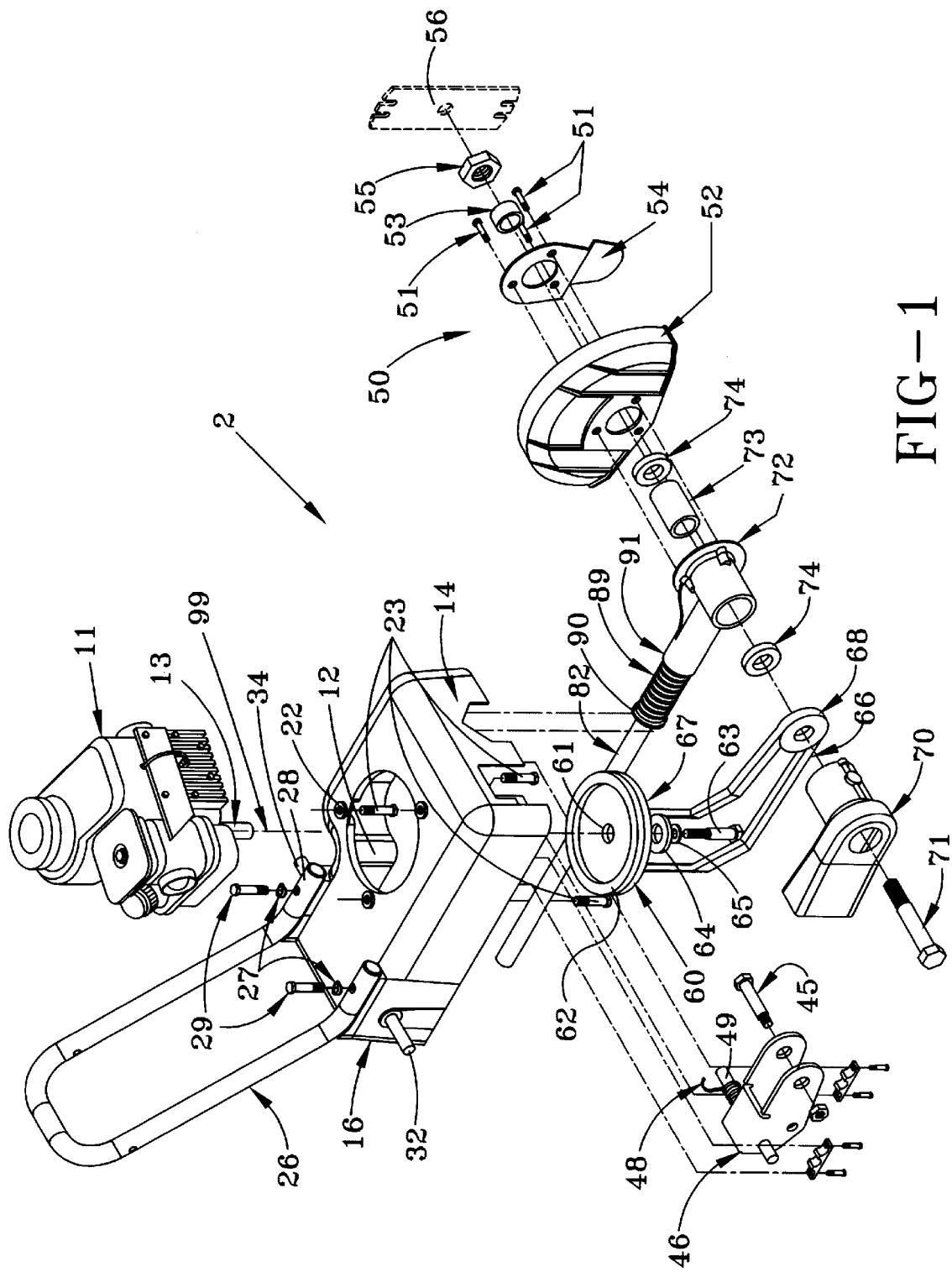
FIG. 1 is an exploded perspective view of the present invention.
Figure 2:
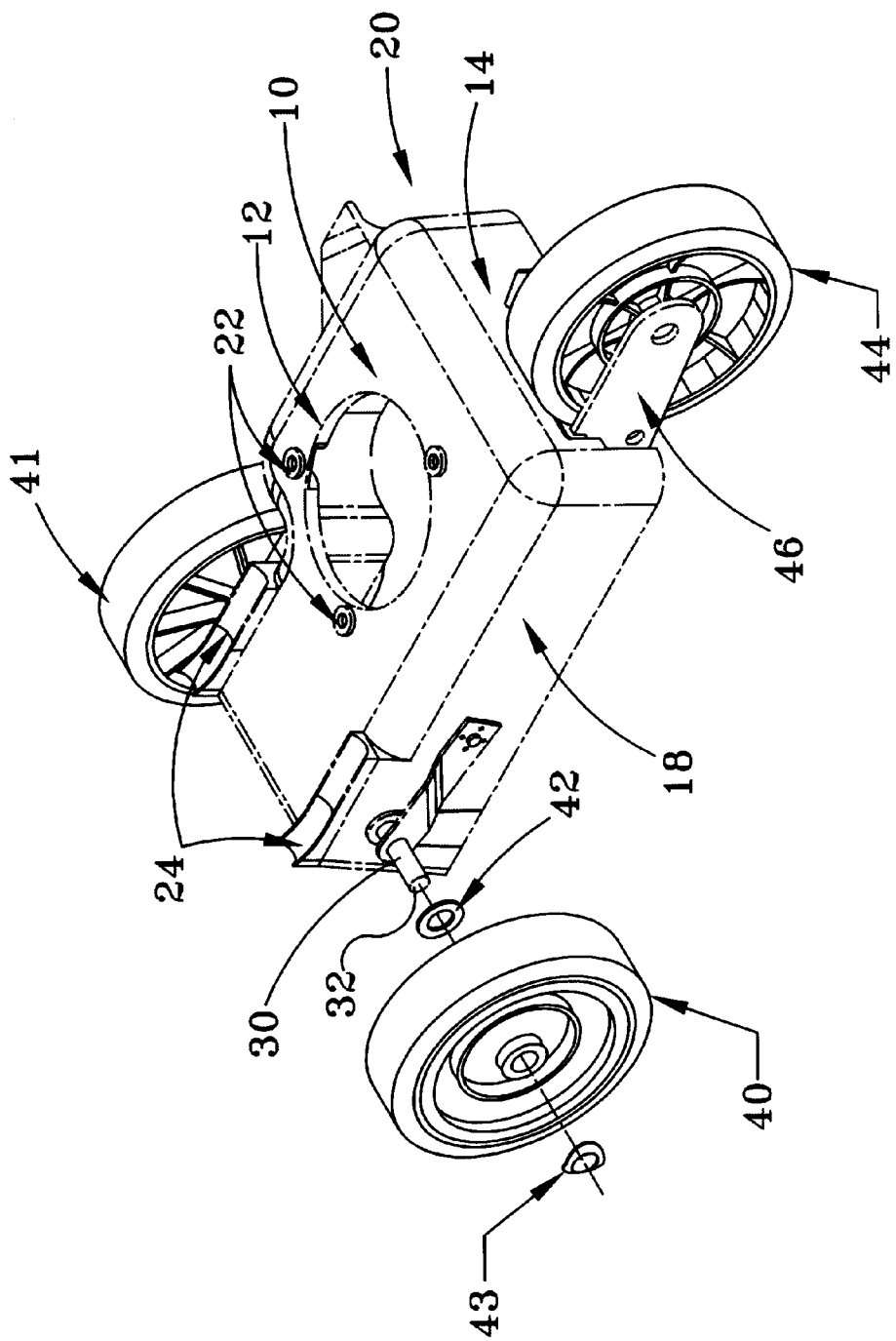
FIG. 2 is a perspective view showing the front and rear wheels attached to the frame.

Referring now to the drawings, which are for purposes of illustrating a preferred embodiment of the invention only, and not for purposes of limiting the invention, FIG. 1 shows an exploded perspective view of a vertical drive shaft lawn edger 2. The edger 2 has a frame 10 that receives a vertical drive shaft engine 11 within a hole 12. The frame 10 supports the vertical drive shaft engine 11. The frame 10 has downturned front and rear portions 14, 16. The downturned portions 14, 16 serve to enclose the lower portion of the engine 11. A rear axle 30 extends through the side portions 18, 20 of the frame 10. The rear axle 30 has first and second ends 32, 34 and a midpoint 36. The midpoint 36 is located halfway between the first and second ends 32, 34. With reference to FIG. 2, the rear wheels 40, 41 are mounted to the axle 30 by a washer 42 and push cap 43.

A front wheel 44 is pivotally mounted to the frame 10 by a pivotal mounting bracket 46. The front wheel 44 is longitudinally and latitudinally displaced with respect to the midpoint 36 of the rear axle 30. In the preferred embodiment, the outer diameters of the rear wheels 40, 41 are equal to an outer diameter of the front wheel 44.

With reference to FIG. 1, the engine 11 mounts to the frame 10 through engine mounts 22 and is secured to the frame 10 by screws 23. The vertical drive shaft 13 of the engine 11 extends vertically downward within the hole 12 of the frame 10. The drive shaft 13 transmits the power from the engine 11 to a drive pulley 64. As shown in FIG. 4, the drive pulley 64 is mounted to the end of the drive shaft 13 and includes a belt 66 to drive an edging means 50.

Figure 3:
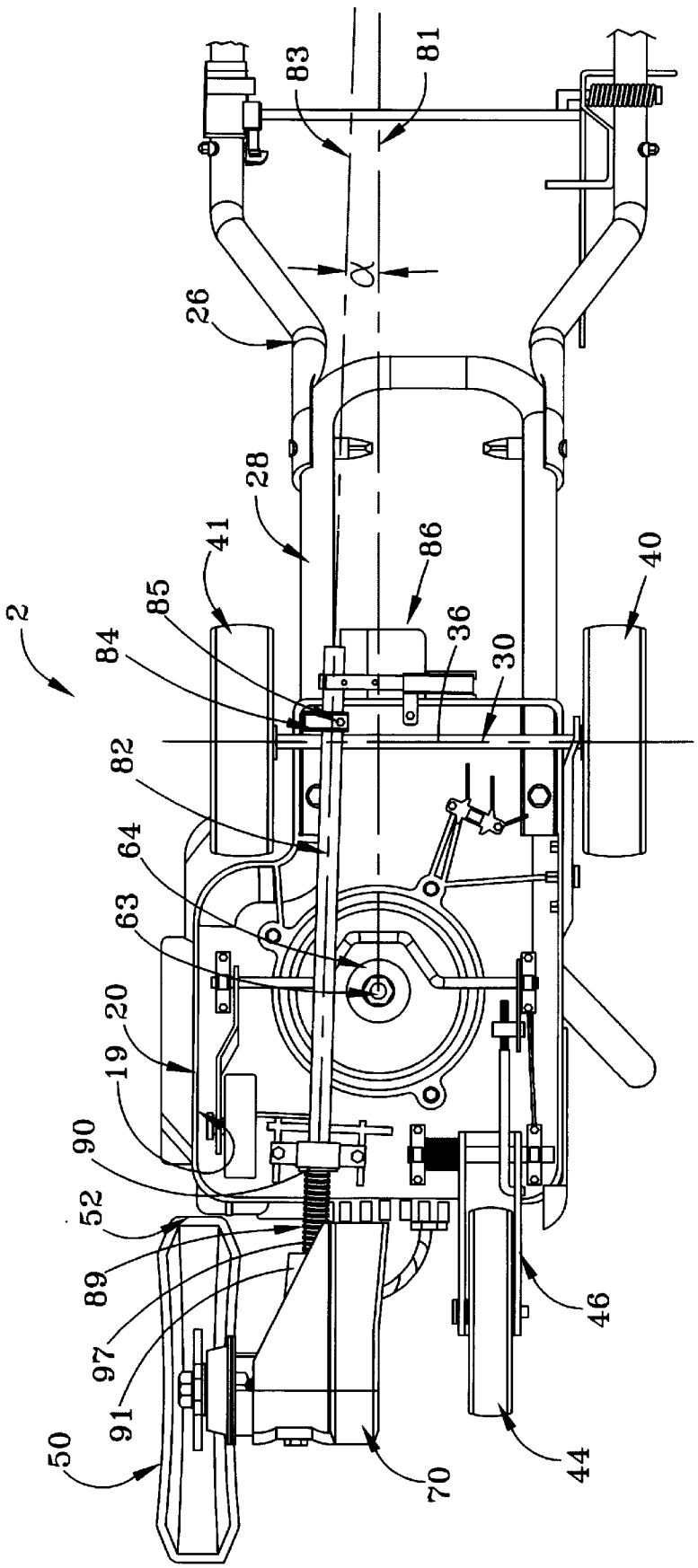
FIG. 3 is a bottom view of the present invention.

With reference to FIGS. 1–3, the operator controls the movement of the lawn edger by a handle 26. Arms 28 of the handle 26 are mounted to handle rest portions 24 of the frame 10. Screws 29 along with saddle washers 27 secure the arms 28 to the frame 10.

The vertical drive shaft 13 extends into a center hole 61 of a flywheel/pulley assembly 60. The flywheel/pulley assembly 60 is securely mounted to, and rotatable by, the drive shaft 13. The drive pulley 64 is located below the flywheel 62. A screw 63 and washer 65 secure the flywheel/pulley assembly 60 to the drive shaft 13. The belt 66 extends around the drive pulley 64 and also around a driven pulley 68. The drive pulley 64 transmits the power from the engine 11 via the belt 66 to the driven pulley 68. The driven pulley 68 drives a blade 56 of edging means 50. The driven pulley 68 and a portion of the belt 66 are guarded by a belt edger guard 70. A screw 71 secures the belt edger guard 70 to the driven pulley 68. The edging means 50 is secured to a bearing spindle housing 72. A spacer 73 and bearings 74 are seated within the bearing housing 72. During operation of the edger 2, the bearings 74 aid with the rotation, and hence, the cutting action of the blade 56.

The edging means 50 comprises a blade guard 52, a blade guide 54 and blade 56. The blade guide 54 is secured to the blade guard 52 by screws 51. A spacer 53, the screw 71, and a nut 55 secure the belt edger guard 70, the driven pulley 68, the bearing housing 72, the blade guard 52 and the blade guide 54 together as a unit.

With reference to FIG. 3, an arbor 82 is shown which stabilizes the edging means 50. The arbor 82 enables the edging means 50 and hence, the blade 56 to extend outward toward the work area of the lawn edger 2. It is preferred to have the edging means 50 extend outward toward the work area to enable the edger 2 to be on stable ground during operation. However, the further outward the edging means 50 becomes the less stable it becomes.

The arbor 82 is shown at an angle $\alpha$ defined as the angle from a center line 83 of the arbor 82 with respect to a longitudinal axis 81 of the vertical drive shaft 13. This longitudinal axis 81 is defined as a line perpendicular to the rotational axis 99 of the vertical drive shaft 13 and perpendicular to the rear axle 30. In its preferred embodiment, the angle $\alpha$ is 5° or less. In its most preferred embodiment the angle $\alpha$ is 3°. As the angle $\alpha$ is increased, the resultant wear on the belt 66 is also increased. Therefore, increasing angle $\alpha$ greater than 5° becomes less and less desirable since the increase of the resultant wear on the belt 66 is increased. The angle $\alpha$ has been defined with respect to the rotational axis of the drive shaft 13. However, any longitudinal axis running perpendicular to the rear axle 30 and lying in the same plane as centerline 83 of the arbor 82 is also within the scope of this invention.

The arbor 82 is mounted to the frame 10 by bracket 84 and is secured by screws 85. A pivoting assembly 86 enables the arbor 82 to pivot thereby changing the angle $\alpha$. The arbor 82 has the bearing spindle housing 72 attached at a first end 97 nearest the edging means 50. The bearing spindle housing 72 is mounted to the blade guard 52. A compression spring 89 is located between a washer 90 and an end 91 of the bearing spindle housing 72. The compression spring 89 allows the bearing spindle housing 72 and hence, the edger means 50, to move axially along the arbor 82. This axial movement along the arbor 82 allows the edging means 50 to deflect slightly when encompassing non-yielding structures, such as curbs or lawn sprinkler heads. The belt edger guard 70 encompasses the bearing spindle housing 72 to protect it from flying debris and the like.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:
I claim:

1. An improved lawn edger comprising:

an engine having a vertical drive shaft, said vertical drive shaft having a rotational axis;

a rear axle having a centerline;

a frame having front, side and rear portions, and front and rear downturned portions, said engine being accepted within a center hole in said frame;

an adjustable arbor mounted to said frame, extending beneath entire said frame and having a centerline lying in a plane, said centerline of said arbor located at an angle $\alpha$ of less than, or equal to 5° from a longitudinal axis, said longitudinal axis defined as an axis perpendicular to said centerline of said rear axle and lying in the same plane as said centerline of said arbor; and, a pivoting assembly mounted to said rear portion of said frame and able to pivot said arbor to increase or decrease said angle $\alpha$.

2. The lawn edger as recited in claim 1, wherein said arbor further comprises:

a bearing spindle housing located along said arbor;

a washer located along said arbor;

a spring, said spring located along said arbor and between said washer and said bearing spindle housing;

whereby said spring deflects allowing said bearing spindle housing to move along said arbor.

3. The lawn edger as recited in claim 1 wherein said arbor is located at an angle $\alpha$ of 3° from said longitudinal axis.

4. An improved lawn edger, comprising:

an engine having a vertical drive shaft, said vertical drive shaft having a rotational axis;

a rear axle having a centerline;

a frame having front, side and rear portions, and front and rear downturned portions, said center hole accepting said enging;

an arbor mounted to said frame and having a centerline, said centerline of said arbor located at an angle $\alpha$ of less than 5° from a line perpendicular to said rotational axis and perpendicular to said centerline of said rear axle; and, a pivoting assembly mounted to said rear portion of said frame and able to pivot said arbor with respect to said centerline of said rear axle.

5. The lawn edger as recited in claim 4, wherein said arbor further comprises:

a bearing spindle housing located along said arbor;

a washer located along said arbor;

a spring, said spring located along said arbor and between said washer and said bearing spindle housing whereby said spring deflects allowing said bearing spindle housing to move along said arbor.

6. The lawn edger as recited in claim 4 wherein said arbor is located at an angle $\alpha$ of 3° from said perpendicular line.

7. An improved lawn edger comprising:

an engine having a vertical drive shaft, said vertical drive shaft having a rotational axis;

a rear axle having a centerline;

a frame having front, side and rear portions, and front and rear downturned portions, said engine being accepted within a center hole in said frame;

an arbor mounted to said rear portion of said frame and having a centerline, said centerline of said arbor located at an angle greater than or less than 90° with respect to said centerline of said rear axle; and, a pivoting assembly mounted to said rear portion of said frame and able to pivot said arbor with respect to said centerline of said rear axle.

8. An improved lawn edger comprising:

an engine having a vertical drive shaft, said vertical drive shaft having a rotational axis;

a rear axle having a centerline;

edging means;

a frame having front, side and rear portions, and front and rear downturned portions, said engine being accepted within a center hole in said frame; and an adjustable arbor having a first and second end, said first end mounted to said rear portion of said frame and said second end mounted to said edging means, said arbor able to directly adjust said edging means away from said frame; and, a pivoting assembly mounted to said rear portion of said frame and able to pivot said arbor with respect to said centerline of said rear axle.

9. An improved lawn edger comprising:

an engine having a vertical drive shaft, said vertical drive shaft having a rotational axis;

a rear axle having a centerline;

a frame having front, side and rear portions, said engine being accepted within a center hole in said frame; and an arbor mounted to said frame, extending beneath said frame and having a centerline lying in a plane, said centerline of said arbor located at an angle $\alpha$ of less than, or equal to 5° from a longitudinal axis, said longitudinal axis defined as an axis perpendicular to said centerline of said rear axle and lying in the same plane as said centerline of said arbor; and, a pivoting assembly mounted to said rear portion of said frame and able to pivot said arbor to increase or decrease said angle $\alpha$.

* * * * *